(No Model.)
A. H. DICKEY.
TWO WHEELED VEHICLE.
No. 274,739. Patented Mar. 27, 1883.
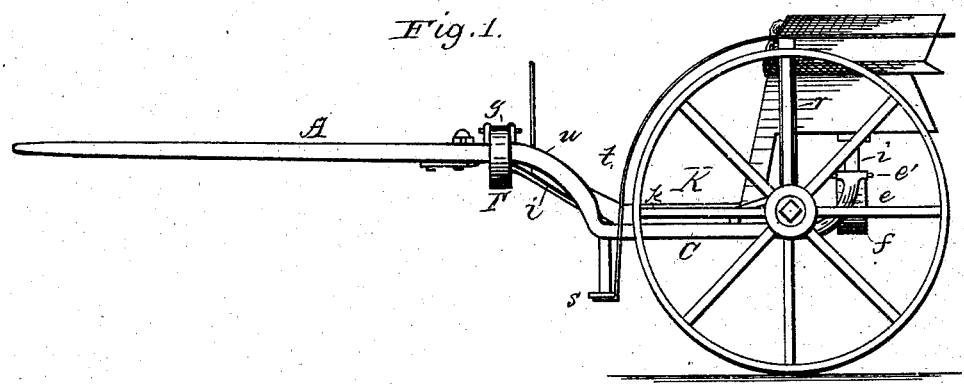
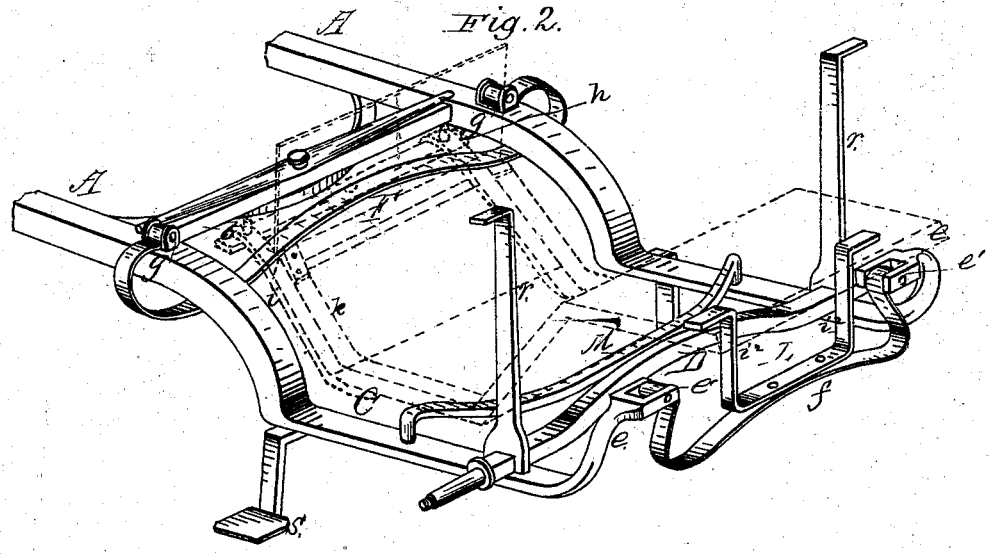
Witnesses:
E. M. Johnson
W. B. Masson
Inventor:
Alexander H. Dickey
Attorney.

UNITED STATES PATENT OFFICE.

ALEXANDER H. DICKEY, OF CONNERSVILLE, INDIANA.

TWO-WHEELED VEHICLE.

SPECIFICATION forming part of Letters Patent No. 274,739, dated March 27, 1883.

Application filed January 18, 1883. (No model.)

*To all whom it may concern:*

Be it known that I, ALEXANDER H. DICKEY, a citizen of the United States of America, residing at Connersville, in the county of Fayette and State of Indiana, have invented certain new and useful Improvements in Two-Wheeled Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in that class of two-wheeled vehicles commonly known as "dog-carts," its object being to render such vehicle light and strong in construction, easy-riding, convenient in mounting and alighting, and so balanced that the shafts will have a light and easy bearing on a horse.

With these ends in view the invention consists in certain novel constructions and combinations of parts, which will be hereinafter particularly described, and pointed out in the appended claims.

In the accompanying drawings, Figure 1 is a side elevation of a two-wheeled vehicle constructed according to my invention. Fig. 2 is a perspective view of the running-gear with the body removed.

The shafts are designated by the letters A A. They are curved downward at their rear ends, behind the whiffletree-bar $b$, and provided with rearward extensions, C, which are connected with the axle D and curved upward and inward behind the same, as shown at $e$, to form arms, terminating in shackles $e'$, by which are secured the opposite ends of the rear body-spring, $f$.

To the shafts, immediately in the rear of the whiffletree-bar, are secured shackles $g$, to which are secured the opposite ends of the front body-spring, F. This spring F is curved upward at its center, and has secured to the middle portion of its upper side a bar, $h$, upon the opposite ends of which are secured the forwardly-projecting ends of arms $i$, which are secured to the side beams, $k$, of the body K.

Upon the rear body-spring, $f$, sits a frame, L, having upwardly-projecting arms $i^2 i^2$, which support the rear or seat portion of the body.

The letter M indicates a curved brace-bar, the intermediate portion of which is secured to the axle, while its end portions are bent forward and firmly attached to the extensions C of the shafts.

The letter $s$ indicates the mounting-steps, projecting outwardly from arms which depend from the extension-bars C in front of the wheels. To these steps are attached the forward lower ends of fenders $t$, which curve upward and backward over the wheel, and have their upper ends supported by standards $r$, rising from the axle.

The side beams, $k$, of the body have their forward ends about on a level with the upper curved portions of the shafts, and between the same, and then curved downward and rearward to about the level of the extension-bars C, extending rearwardly to near the axle, and are then inclined upward to a suitable height for a seat, and their upper end portions are then extended rearward over the axle to support the seat-box. These side beams are connected by suitable end beams, and to their front ends the foot-board $u$ is secured. These side beams are floored underneath to form the bottom of the body, the elevated seat portion of which rests upon the arms $i$ of the frame F.

In a vehicle thus constructed, it will be observed that while the body is well forward of the axle, so that it will have but very little of the disagreeable tilting motion so common in vehicles of this class, there will be but a light bearing on the horse, as the seat is directly over the axle and supported by the spring $f$ to the rear thereof, and the front spring, F, eases off the jolting. The arrangement of these springs is such, in connection with the balancing of the body, as to render the vehicle comfortable both to horse and rider. The bar $m$ braces the extension-bars C and the shafts firmly against sidewise strain in turning the vehicle.

It will be further observed that the vehicle, as described and shown, is extremely convenient to get into and out of, the entrance portion being well forward of the wheels and depressed to such an extent that a slight raising of the foot is necessary to reach the step.

Having now fully described my invention, what I claim is—

1. The combination, with the downwardly-curved shafts, the extension-bars C, and axle D, of the upwardly and inwardly curved arms e, the rear spring, f, and the front spring, F, substantially as described.

2. The combination, with the downwardly-curved shafts, the extension-bars C, arms e, and the spring f, carried by said arms, of the body having the elevated seat portion, the frame L, mounted on said spring, for supporting said seat portion of the body, and a suitable spring carried by the shafts for supporting the front end of the body, substantially as described.

3. The combination, with the shafts, extension-bars, and axle, of the brace-bar having its intermediate portion secured to the axle and its end portions bent forward and secured to the said extension-bars, substantially as described.

In testimony whereof I affix my signature in presence of two witnesses.

ALEXANDER H. DICKEY.

Witnesses:
THOMAS F. HAMILTON,
WILLIAM C. FORREY.